Sept. 11, 1962 B. STAHMER 3,053,483

JET-DIVERSION DOME AIRCRAFT

Filed April 26, 1961 5 Sheets-Sheet 1

INVENTOR.
B. STAHMER
BY Hiram A. Sturges
Agent

INVENTOR.
B. STAHMER
BY Hiram A. Sturges
Agent

Sept. 11, 1962 B. STAHMER 3,053,483
JET-DIVERSION DOME AIRCRAFT
Filed April 26, 1961 5 Sheets-Sheet 3
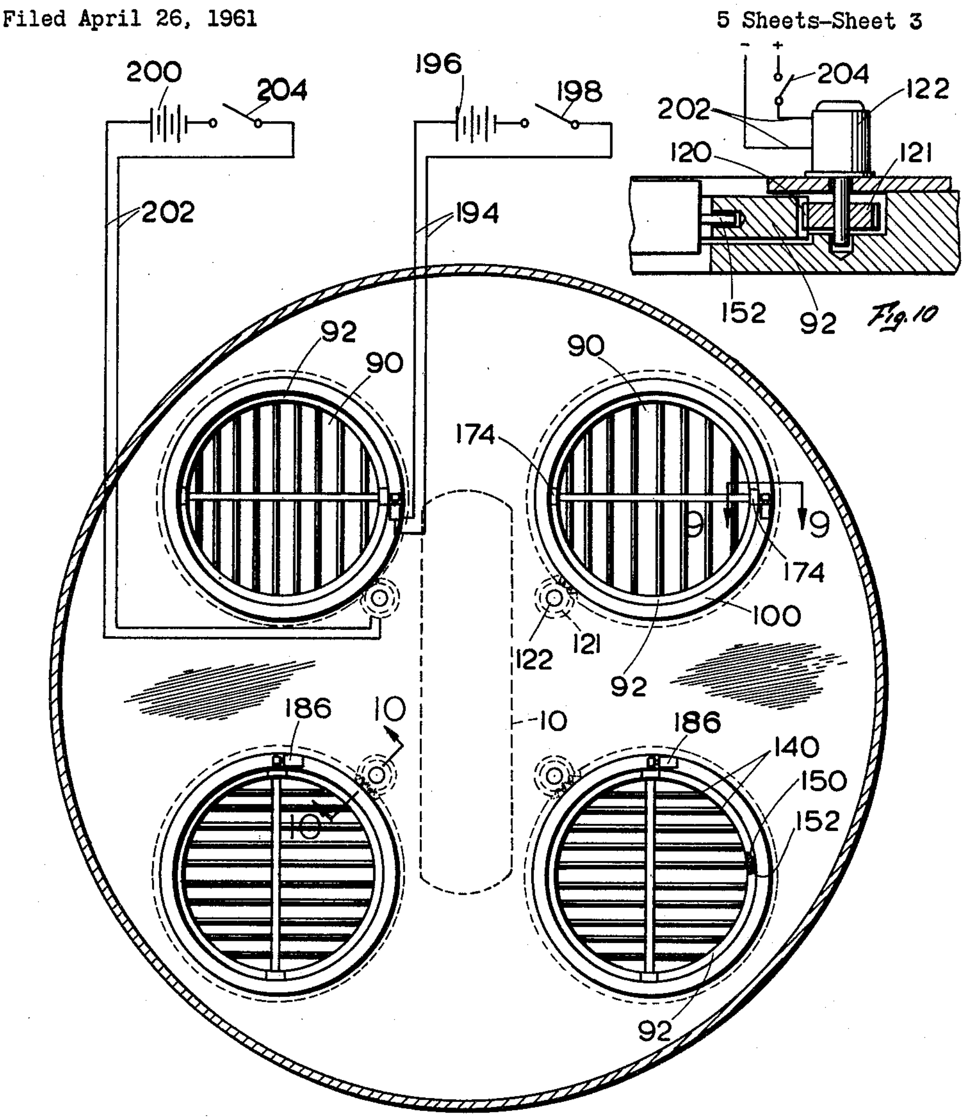
Fig. 10
FIG. 4
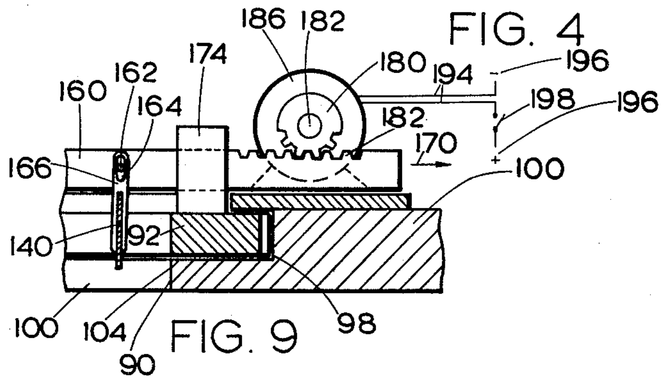
FIG. 9
INVENTOR.
B. STAHMER
BY [signature]
Agent INVENTOR.
B. STAHMER
BY [signature]
Agent INVENTOR.
B. STAHMER
BY [signature]
Agent United States Patent Office 3,053,483

Patented Sept. 11, 1962

3,053,483

JET-DIVERSION DOME AIRCRAFT

Bernhardt Stahmer, 1509 Chicago St., Omaha, Nebr.

Filed Apr. 26, 1961, Ser. No. 105,680
7 Claims. (Cl. 244—29)

This invention relates to jet aircraft and more particularly it is an object of this invention to provide a jet aircraft which is provided with a gas expansion chamber which is adapted to direct the exhaust thrust of the jet engine downwardly for providing a greater lifting power that is normally found in jet aircraft.

More particularly it is an object to provide a jet aircraft as described the housing of which channels the direction of the jet thrust into a vortex with the gases moving around and around in the housing as they move continually downwardly toward outlet openings at the bottom of the housing.

A further object of the invention is to provide means for directing the thrust of the jet engine downwardly and at the same time housing a large quantity of hot exhaust gas with the advantage of utilizing this hot exhaust gas for lifting effect much as hot gases have heretofore been used in balloons, whereby the lifting effect of the hot exhaust gases of the jet engine are not wasted as they have been heretofore.

In the past jet engines have been used to provide either a rearward thrust for forward motion or a downward thrust for a lifting effect, but never has the exhaust gas been contained in such a way as to utilize it for a balloon-like lifting effect.

A particular object is to provide a diversion housing and an expansion chamber for jet exhaust gases which is particularly adapted to permit these gases to move with the minimum loss of force as they are at all times diverted by curved surfaces rather than being abruptly changed in direction as would cause them to lose their force, whereby when the gases finally reach the bottom of the diversion housing, they are still moving both downwardly and centrifugally with a high force, the downward force being partially from the downward diversion of the housing itself and partially from the tendency of the cooler gases to be forced downwardly by gases entering later which have not yet cooled and thereby being of greater heat seek the top of the diversion dome forcing earlier discharged gases downwardly.

A further object is to provide a jet aircraft as described which is provided with means for directing the downmoving gases which are leaving the vortex-creating diversion dome such as that the gases can be directed to the right or to the left, forward or backward of the aircraft and preferably in any direction for controlling both the balance and the direction of flight of the aircraft.

A further object is to provide an aircraft as described which can have a plurality of vortex-creating jet diversion domes for providing a greater lifting power as is needed for carrying very heavy cargoes.

Still another object is to provide an aircraft as described, the jet engine of which can be mounted for directing air centrifugally of the jet diversion dome which is circular in top plan view and convex on its upper side as seen in side elevations, or an aircraft in which the jet engine can be mounted to discharge upwardly, in which case, the aircraft has my new concept of an inverted cone with concave side surfaces gradually directing air outwardly under a dome convex on its upper side and concave on its lower side whereby the gases, with minimum loss of their force, are directed downwardly to downward facing openings through which the exhausting gas passes for providing a lifting effect.

Still a further object is to provide aircraft as above described which is further provided with means for admitting external air into the stream of jet exhaust gases whereby the external air cools the jet exhaust gases sufficiently to remove any danger of damage to the dome because of the high heat of the jet exhaust itself.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawings:

FIGURE 4 is a sectional view taken along the line 4—4 of FIGURE 3.

FIGURE 9 is a view-in-section taken along the line 9—9 of FIGURE 4.

FIGURE 10 is a view-in-section taken along the line 10—10 of FIGURE 4.

Figure 2:
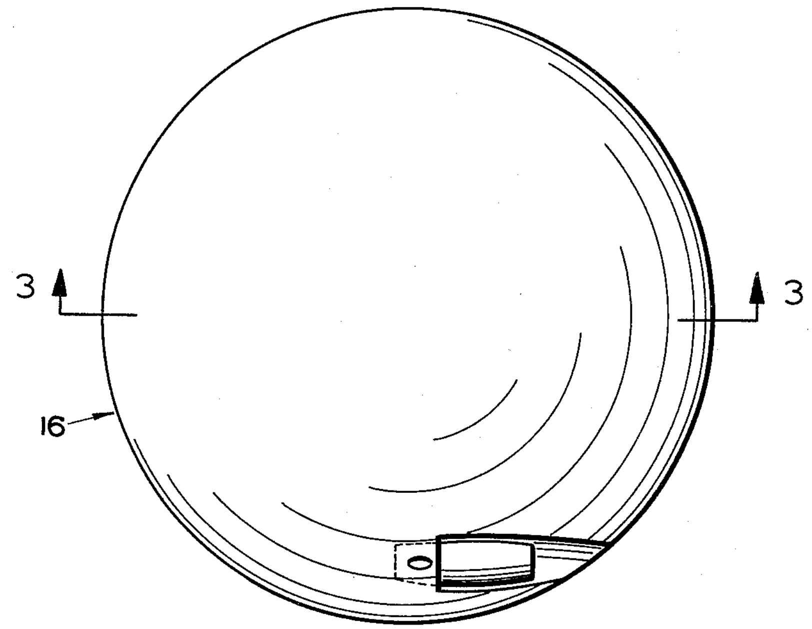
FIGURE 2 is a top plan view of the aircraft of FIGURE 1.
Figure 1:
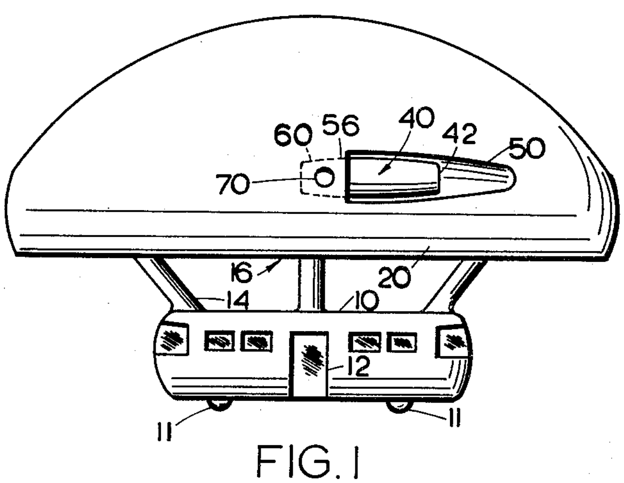
FIGURE 1 is a side elevation of a preferred modification of the aircraft in which the jet engine is mounted for delivering its thrust centrifugally of a diversion dome.

Referring to FIGURE 1, it will be seen that the jet aircraft of this invention has a gondola 10 provided with a large door 12 through which heavy and bulky freight can be delivered.

Figure 3:
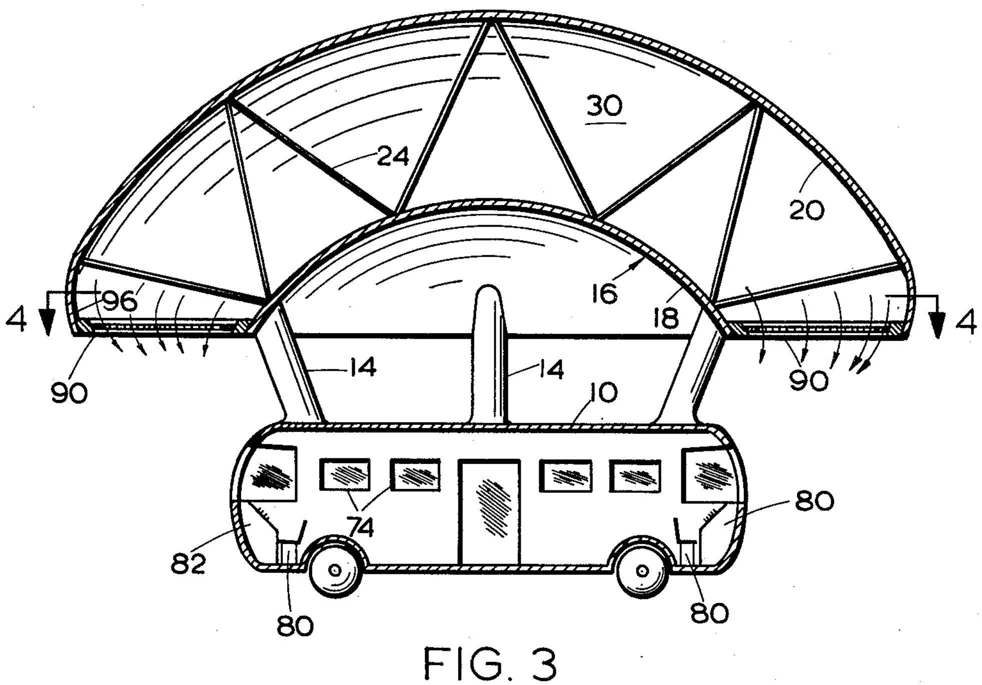
FIGURE 3 is a sectional view taken along the line 3—3 of FIGURE 2.

The aircraft has a frame 14 standing upwardly, as best seen in FIGURE 3, at several points where a plurality of members of the frame 14 are attached to the underside of a vortex- creating jet diversion dome generally indicated at 16 and having an underside 18 which is concave on its undersurface and convex on its uppersurface.

The vortex dome 16 has an upper cover 20 which is concave on its underside and convex on its upperside much as is the bottom or lower cover 16 and suitable bracing 24 is provided extending between the under cover 18 and the upper cover 20.

It will be seen that the covers 18 and 20 are spaced apart a considerable distance for providing a very large open area 30 therebetween for the reception of exhaust gases of a jet engine 40 as best seen in FIGURE 1. The jet engine 40 is preferably mounted generally tangentially to the vortex dome 16 which latter is circular as seen in top plan view and is also preferably substantially circular as it would be seen in any horizontal section.

The jet engine 40 is mounted with its forward end 42 extending outwardly of the upper cover 20 and the outer portion 42 of the engine is preferably received in a recess 50 in the upper cover 20, the recess 50 being generally tangentially exposed with respect to the cover 20 and the outer end of the jet engine 40 is open as is conventional for admitting air.

The inner end of the jet engine 40 is seen in FIGURE 1 at 56 and the housing 60 is attached to the inner end of the jet engine 40 and is disposed in communication therewith, the housing 60 having its outer side substantially against the inner side of the upper cover 20 and there being an opening 70 extending through the housing 60 and out through the upper cover 20 whereby external air can pass through the opening 70 and mix with the jet gases in the housing 60 whereby the temperature of the mixture of these external gases or air and the exhaust gases of the engine 40 is a much lower temperature than the exhaust gases themselves and the housing 60 and the opening 70 can be of any size sufficiently to reduce the temperature of the gases in the housing 60 enough so that the temperature of gases entering the inside 30 of the vortex dome 16 is such that it will not injure the material of which the vortex dome 16 is constructed.

It will be seen that the gondola 10 has wheels 11 on its underside and, as best seen in FIGURE 3, is provided with windows 74, and operators' seats 80 beside control panels 82.

Referring now to FIGURE 3, it will be seen that the vortex dome 16 has openings 90 therethrough which are disposed on the underside of the vortex dome 16 whereby gases from the interior 30 thereof pass downwardly and outwardly with great force and great lifting effect.

As best seen in FIGURE 3, the upper cover 20 has a substantially uniform arc, being the arc of a circle having a center preferably at the bottom or below the gondola 10 whereby the upper cover 20 has a gradual arc which is preferably in parallelism to the under cover 18 which latter is formed concentrically with the upper cover 20 but on a lesser radius.

However, in the area of the upper cover which is immediately above the openings 90, the cover is preferably curved inwardly at 96, as best seen in FIGURE 3, for directing gases inwardly and downwardly for the purpose of counteracting the centrifugal force which would otherwise cause the gases to move outwardly as they escape through the openings 90.

As best seen in FIGURE 4, each opening 90 is preferably of circular shape in top plan and is provided with a vane-carrying ring 92 which is suitably mounted for rotation in a recess 98 in an annular lower wall 100 which surrounds the outer side of each opening 90, the lower wall 100 being securely attached to both the upper cover and the under cover around the circumference of the opening 90 whereby it is the inner edge of the annular lower wall 100, such inner edge being shown at 104, which actually defines each opening 90.

Referring now to FIGURE 10, it will be seen that each carrier ring 92 is provided with gear teeth 120 on its circumference, which latter are adapted to be engaged by suitable gears 121 mounted on shafts of motors 122, whereby as the motors 122 are operated, the gears 121 can rotate the carrier rings 92 for rotation in a horizontal plane. The motors 122 and gears 121 thereby control the direction of flight of the aircraft in unison with means now to be described.

Direction of flight-controlling vanes 140 are disposed in parallelism and spaced apart across each respective ones of the carrier rings 92 and are suitably attached thereto for rotation of the vanes. This attachment is accomplished by the provision of each vane having an axle such as the axle shown in FIGURE 4 at 150 which latter is received in a suitable recess 152 in the carrier ring 92 whereby the vane 140, having another similar axle 150 suitably received in another recess 152 in the ring 90 at the other end of the respective vane 140. Thus each vane can rotate about a horizontal axis.

The position of the vanes 140 in each ring 92 is controlled by a rack-bar 160 which extends transversely across the upper sides of the vanes 140, the rack-bar 160 having fins 162 thereon adapted to be received in slots 164 which latter are vertically elongated and are disposed in a guide 166 which latter extends down to the respective vane 140.

As thus described, when the rack-bar 160 is moved in the direction of the arrow 170, the vane 140 will be in a position for deflecting outwardly rushing gases in one direction and when the bar 160 is moved in a direction opposite to the arrow 170, the vane 140 will be in a position for deflecting the out-rushing gases in an opposite general direction, although both of these directions are downwardly.

The rack-bar 170 is mounted in suitable bearings 174 mounted on the respective carrier ring 92 and a pinion 180 is in mesh with the teeth 182 of the rack-bar 160.

The pinion 180 is mounted on the drive-shaft 182 of a motor 186, which latter is an electrical motor.

Each motor 186 is connected by wires 194 to a source of electrical energy 196 and to a switch 198 connected to the other terminal of the source of electrical energy 196 and an illustrative wiring diagram to this effect is found in FIGURE 4, although for convenience of illustration and for clarity of the drawing, the wiring diagrams for the other motors 186 are not here shown.

Each of the motors 122 is connected also to a source of electrical energy 200 by wires 202, one of which is connected through a switch 204. As thus described, it will be seen that each carrier ring can be rotated horizontally to direct its vanes 140 by control of the motors 122 through the switch 204, and also the vanes 140 can be tilted through use of the rack-bar 160, respective pinion 180, and motor 186 controlled by the switch 198, for directing the gases further in any suitable manner.

In operation, the direction of flight of the aircraft can be completely controlled, the amount of energy applied to lifting power proportional to horizontal travel can be easily regulated.

Figure 6:
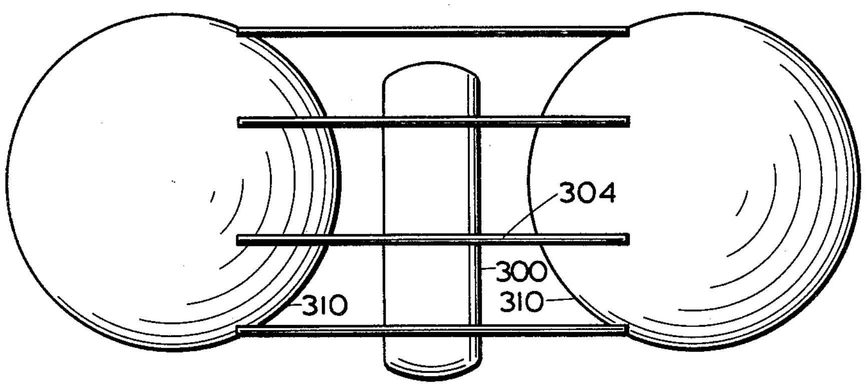
FIGURE 6 is a top plan view of the aircraft of FIGURE 5.
Figure 5:
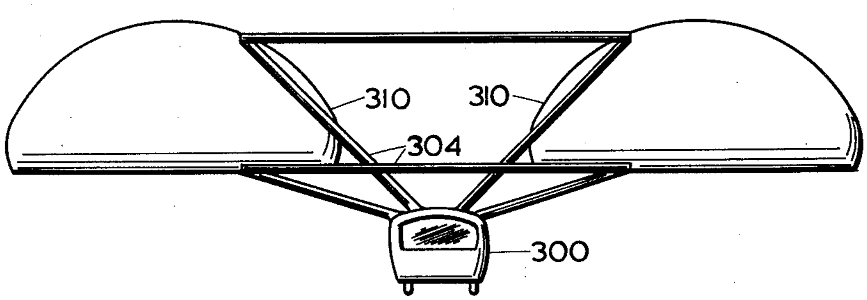
FIGURE 5 is a frontal elevation of a modification of the aircraft in which there are two jet vortex units or diversion domes.

Referring now to FIGURES 5 and 6, a modification of the invention is there shown in which a gondola 300 is carried on a framework 304 which connects the gondola 300 to two gas expansion chambers 310 disposed preferably one on each side of the gondola. The chambers 310 can be identical in construction to the vortex dome 16.

Figure 8:
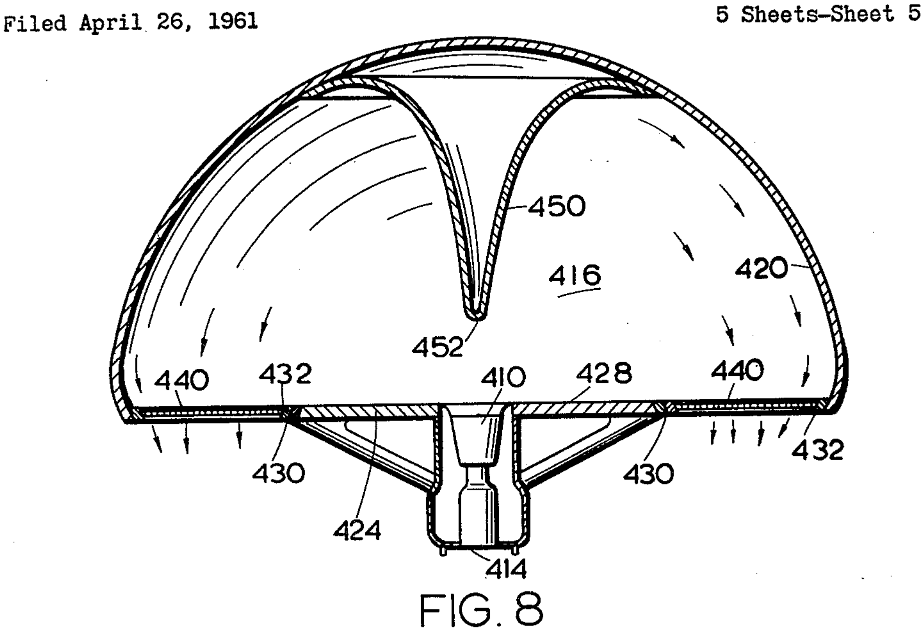
FIGURE 8 is a sectional view taken along the line 8—8 of FIGURE 7 showing how, in this modification, jet gases are delivered directly upward.
Figure 7:
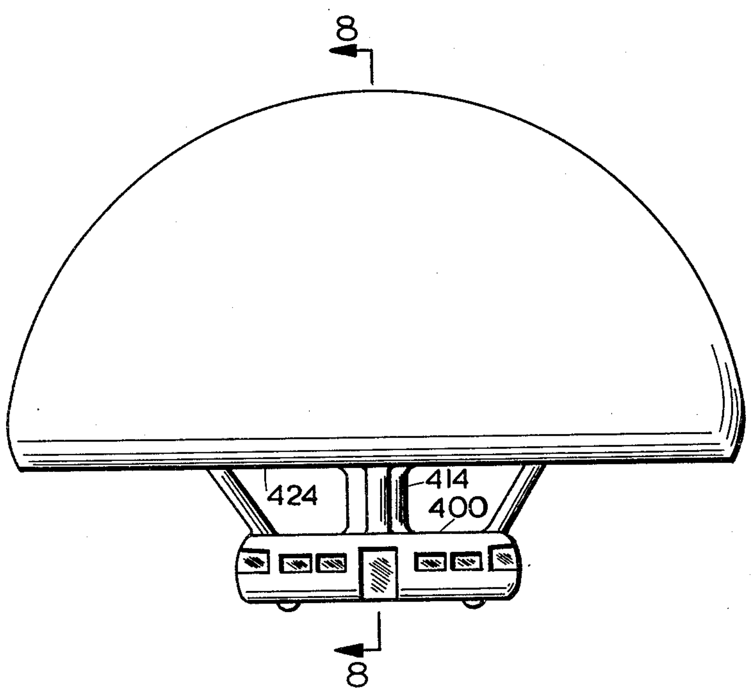
FIGURE 7 is a side elevation of a modified form of a heavy cargo lifting aircraft.

The vortex domes or gas expansion chambers 310 of a multiple vortex dome assembly such as FIGURE 6 can be formed identically to the vortex dome 16 of FIGURE 1 or they can be formed of a modification shown in FIGURES 7 and 8 and now to be described. However, since either of these types of domes can be used, the drawings of FIGURES 5 and 6 are schematic and the detail of the jet engine of FIGURE 1 is not repeated therein for convenience of illustration.

Referring now to FIGURE 7, we there see a modified jet aircraft having a gondola 400 which latter has a jet engine 410 extending up through the gondola and opening for air intake out through the bottom of the gondola through an opening generally indicated at 414 in FIGURE 8, the upper end of the jet engine 410 opening upon the interior 416 of a modified vortex dome which has an upper cover 420 which is concave on its underside and convex on its upperside. The vortex dome of FIGURE 8 is identified by the numeral 424 and has a bottom wall 428 which closes the underside of the dome 424, except for suitable opening 430 similar to the openings 90 of the modification in FIGURE 4, the openings 430 having carrier rings 432 therein similar to the carrier rings 92 of FIGURE 4 in which flight-controlling vanes 440 are arranged similar to the vanes 140 of FIGURE 4.

In the modification of FIGURE 8, an outwardly and downwardly deflecting baffle 450 is provided which is of generally the shape of an inverted cone having an apex 452 disposed preferably below the center of a chamber 416, but spaced from the jet engine 410.

The baffle 450 has outer surfaces which are concave and which taper outwardly, then horizontally, and then even downwardly to generally meet the downward curvature of the upper cover 420 to which the diversion baffle is secured.

The construction of the diversion baffle is such that upwardly forced jet gases will be diverted first outwardly then laterally and then downwardly by the diversion baffle 450 and then further downwardly by the downward and outward curvature of the upper cover 430 until at the lower end of the upper cover 420 the outer periphery of the upper cover 420 curves inwardly directing the gases through the openings 430 past the flight control vanes 440.

As thus described, it will be seen that this invention has provided a jet aircraft fulfilling the above described objectives of greater lifting power, and more economical and practical use of the jet gases, not only for their thrust, but for their lifting effect because of their heat.

From the foregoing description, it is thought to be obvious that a jet aircraft constructed in accordance with my invention is particularly well adapted for use, by reason of the convenience and facility with which it may be assembled and operated, and it will also be obvious that my invention is susceptible of some change and modification without departing from the principles and spirit thereof, and for this reason, I do not wish to be understood as limiting myself to the precise arrangement and formation of the several parts herein shown in carrying out my invention in practice, except as claimed.

I claim:

1. An aircraft having a passenger and cargo gondola, and having a vortex dome attached to and supporting said gondola, said vortex dome having an upper cover concave on its underside and generally of an inverted cup-shape, said upper cover having a bottom wall, said upper cover and said bottom wall forming a gas chamber, said bottom wall having openings therethrough for the outlet of gases, and a jet engine means mounted on said vortex dome in a position for receiving air from the outside of said dome and delivering jet thrust to the gas chamber whereby the hot jet gases tend to provide a lifting effect on said dome for supporting said aircraft, and said dome being sufficiently large to make possible the effective support not only of the weight of said aircraft, but also of its cargo.

2. The combination of claim 1 in which said openings through the bottom wall are provided with flight control means comprising laterally spaced vanes and means mounting said vanes in said openings in a manner such that said vanes are selectively positionable to direct gases in various directions.

3. The combination of claim 2 in which said means for controllably mounting said vanes comprises a plurality of rings rotatably mounted in said openings for rotation of said rings in a horizontal plane for directing the deflection of gases by said vanes.

4. The combination of claim 1 in which said openings are arranged generally around the outside of said dome and in which the lower wall of said dome has a convex upper surface of an inverted cup-like nature for further directing exhaust gases downwardly and outwardly to said openings.

5. The combination of claim 1 in which the jet engine is specifically mounted for directing exhaust gases horizontally into the gas chamber inside said dome.

6. The combination of claim 1 and further comprising a plurality of vortex domes attached to and supporting said gondola.

7. An aircraft comprising: a gondola, a vortex dome, means attaching said gondola to said vortex dome, said vortex dome having an inverted cup-like shape, jet engine means for directing a jet thrust upwardly into said vortex dome at the center thereof, and deflection baffle means extending downwardly from the apex of the interior of said vortex dome, said deflection baffle means being of generally an inverted conical outside shape and being flared outwardly and downwardly at its upper end portion for directing said jet thrust first upwardly then outwardly then downwardly, and said vortex dome having a bottom wall provided with opening means therethrough whereby said jet thrust is directed downwardly through said opening means for further prividing a lift whereby said vortex dome supports said gondola and its cargo.

References Cited in the file of this patent

FOREIGN PATENTS

| | | |
|---|---|---|
| 19,347 | Great Britain | of 1903 |
| 1,006,266 | Germany | Apr. 11, 1957 |
| 208,314 | Austria | Aug. 15, 1959 |

OTHER REFERENCES

Flight Magazine (London), vol. LX, issue 2232, Nov. 2, 1951, page 560.